United States Patent

Brandt et al.

[15] 3,665,510

[45] May 23, 1972

[54] PROGRAM CONTROLLED DATA PROCESSING INSTALLATION FOR SWITCHING A TELEPHONE EXCHANGE

[72] Inventors: Fritz Brandt; Wolfram Ernst, Munich, Germany

[73] Assignee: Siemens Aktiengesellschaft, Berlin and Munich, Germany

[22] Filed: Mar. 20, 1970

[21] Appl. No.: 21,315

[30] Foreign Application Priority Data

Mar. 21, 1969 Germany.......................P 19 14 575.6

[52] U.S. Cl..........................................340/172.5, 179/18 ES

[51] Int. Cl. .......................................H04m 3/00, G06f 9/00

[58] Field of Search.............................340/172.5; 179/18 ES

[56] References Cited

UNITED STATES PATENTS 3,487,170 12/1969 Pearce et al........................179/18 ES 3,497,630 2/1970 Lucas et al.......................340/172.5 X

OTHER PUBLICATIONS

The Bell System Technical Journal, Sept. 1964; No. 1 ESS; pp. 1,870–1,872, 1,887–1,890, and 1,927–1,929.

*Primary Examiner*—Paul J. Henon
*Assistant Examiner*—Melvin B. Chapnick
*Attorney*—Birch, Swindler, McKie & Beckett

[57] ABSTRACT

A program controlled data processing installation which is particularly useful with telecommunication exchange switching is described. The system includes an information processing mechanism controlled by a program control mechanism. The data processing installation is of the type which is capable of executing branching operations upon receipt of a jump command. The installation includes a jump switching network which forms and delivers the jump commands to the program control mechanism. In the jump switching network, internal unconditional jump information and conditional jump information is processed in the course of the execution of a program along with external jump information. The jump switching network includes a plurality of coupling members which are individually associated with the particular jump commands to be executed.

7 Claims, 3 Drawing Figures

PROGRAM CONTROLLED DATA PROCESSING INSTALLATION FOR SWITCHING A TELEPHONE EXCHANGE

BACKGROUND OF THE INVENTION

Program controlled data processing installations are utilized for the processing and evaluation of information which is already present at the initiation of the performance of a predetermined program, and also are utilized in considering new, external information which arrive during the processing of the program. Such installations are called "real-time-installations". An example of such an installation is described in German published patent 1,278,150 and British patent number 1,158,339.

A real-time-installation can be used, for example, for carrying out the switching processes in a telephone exchange. The invention is concerned with a data processing installation wherein external information arrives at the installation which also contains internal information. Real-time-installations are program controlled data processing installations which process a program wherein information is shifted to circuit branches. The shifting is effected through the use of shift commands which are provided, in a manner described in, for example, German displayed patents 1,246,289, and 1,076,407, and 1,094,493.

The invention shows how such a data processing installation can be developed in an especially advantageous manner. The invention makes possible among other things the more rapid processing of a predetermined program, and also a decrease in the number of command words required for operation. The variation of the predetermined program is also made easier by the inventive system. The utilization of the inventive installation is therefore considerably facilitated because of the development of the system in such a favorable manner. The improvement realized by the invention is readily realized when the invention is compared to prior art improvements in the basic computer circuits shown in the text "Digital Calculators" by Ambrose P. Speiser, published by Springer-Verlag, Berlin and Heidelberg, Germany, and New York in 1965 (for example, see pg. 398).

SUMMARY OF THE INVENTION

The invention is directed to a program controlled data processing installation capable of executing branching instructions. Branching is carried out in response to jump commands during the processing of the program. The inventive system is particularily suited for carrying out the switching processes in a telephone exchange. The inventive data processing installation is characterized by the fact that the jump commands, which are to be carried out, are supplied by means of a shift circuit network, which also may be called a jump switching circuit. The internal, unconditional jump information, or internal conditional jump information, which is arrived at in the course of the processing of the program, are connected with additional external jump information which arrives at the installation over input lines during the proceding of the program. Internal conditional jump information refers to jump information generated within the installation which is dependent on other previously processed information, and internal unconditional jump information refers to information generated internally, which is not so dependent. Because the jump commands which are to be executed are supplied by means of a shift circuit network carrying out connection functions, the number of the steps required to obtain a jump command is considerably decreased. The program accordingly can be carried out in a rapid manner. Accordingly, because of the manner of obtaining jump commands in which external jump information is also considered, a wide variation of the program is realizeable.

The shift circuit network contains connection elements which are individually assigned to jump commands which are to be carried out. The connection elements in a given case are tested for their present capability to supply connections which represent the jump commands and thereby determine the execution of branching instructions. Although it is already known that either internal jump information or external jump information can be utilized to obtain jump commands (see German displayed patent 1,094,493), the simultaneous connection, in the manner provided by the invention of internal and external jump information by means of a shift circuit network, and to thereby obtain the jump commands which are to be executed is not known. In the inventive shift circuit network several internal shift informations and several external shift informations can be connected either singly or in combination, so that the shift circuit network can be used in a variety of ways.

BRIEF DESCRIPTION OF THE DRAWINGS

The invention can be understood by making reference to FIGS. 1 and 2 wherein.

DETAILED DESCRIPTION

Figure 1:
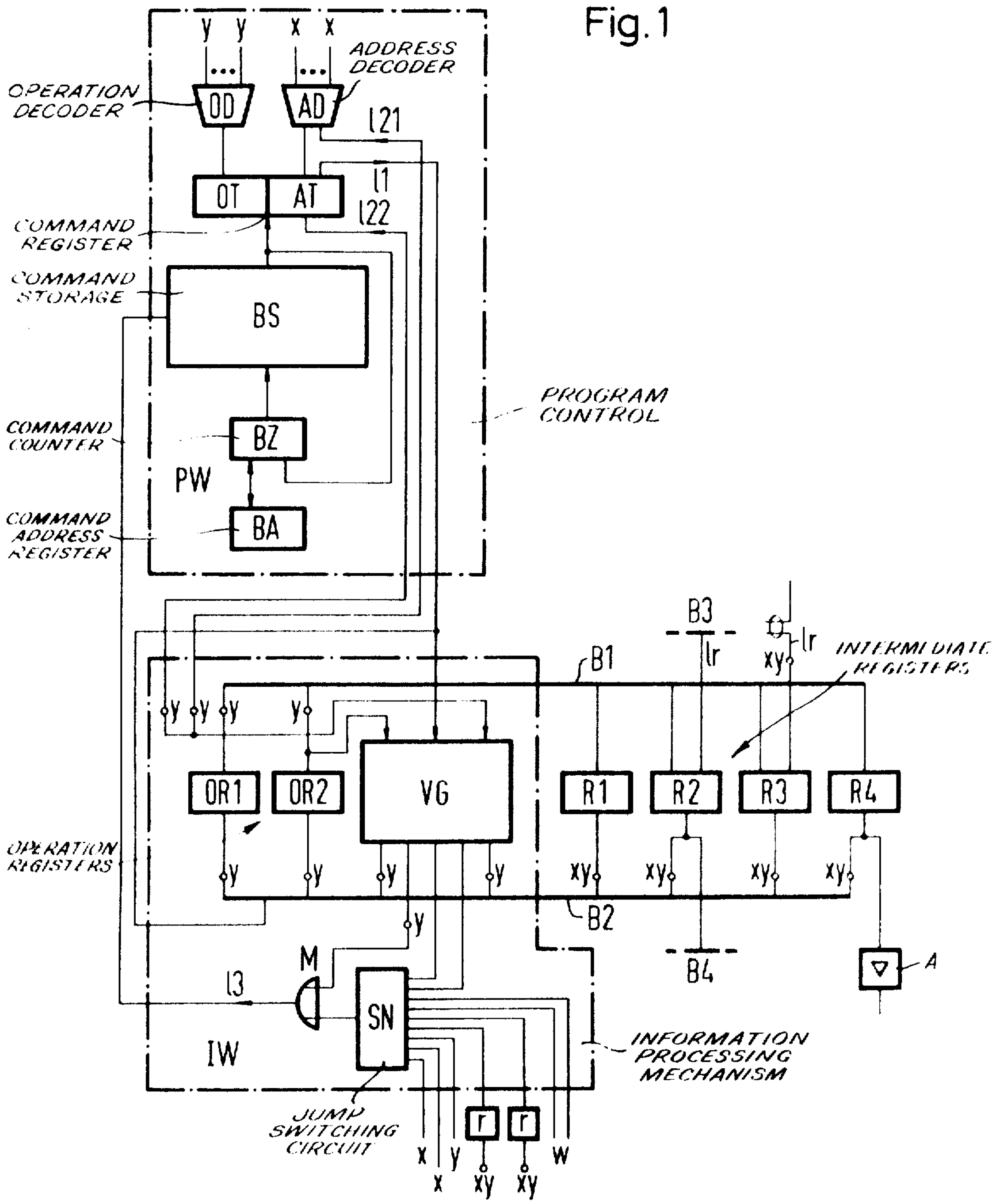
FIG. 1 shows schematic view of the entire data processing installation.

The data processing installation shown in FIG. 1 includes program control mechanism PW and information processing mechanism IW with shift circuit network SN. The program control mechanism PW includes command storage means BS, wherein command words are called up with the aid of command address register BA and command counter BZ, the command words are then conveyed to command register OT-AT. The command storage BS may be constructed similarly to a device indicated as a program store in U.S. Pat. No. 3,497,630, and command counter BZ may be constructed like the elements 2 and 23 in FIG. 1*a* of the same patent. Portion OT of the command register, which receives an operation portion of a command word, is connected to operation decoder OD. Portion AT of the command register, which receives an address portion of a command word is connected to address decoder AD. Operation decoder OD has output terminals *y* which are connected to other points of the data processing installation over connecting lines which are not shown. The signals present on output terminals *y* are used to initiate certain operations in each case. Address decoder AD has output terminals *x*, which are connected to other portions of the data processing installations over lines not shown. Information as it is required for the processing function is supplied by the *x* outputs. The points to which the above-mentioned lines are connected are also designated by *y* and *x*.

Information mechanism IW includes two operation registers OR1 and OR2, as well as specific systems for information processing, which all together are designated VG. The latter operation's registers are constructed like the instruction registers 3 in FIG. 1*b* of the above referenced U.S. Pat. No. 3,497,630. Details of circuit VG and the switching circuits herein are described in application U.S. Ser. No. 21,340 filed of even date herewith by Fritz Brandt, Wolfram Ernst, and Dieter Volgtlen and assigned to the same assignee as the instant invention.

Intermediate registers R1 . . . R4 are provided for the intermediate storage of information, over a short period or over a longer period. Intermediate register R2 has access to distributor lines B3 and B4, which, for example, lead to other, but similar, data processing installations, so that an interaction of several such data processing installations is possible. Other systems supply external information which can also be considered during the processing of a program over intermediate register R3. The external information is forwarded, for example using operation register OR1, over line 121 to address decoder AD. The external information accordingly can be additionally modified. The information is then also utilized over address decoder AD, to call up information from specific systems.

The systems which supply the external information can include ring cores, the operational condition of which is tested over intermediate register R3. Accordingly, this intermediate register is also utilized as the reading register.

External information can also arrive directly at shift circuit network SN over input lines *w*. Information arrived at during the information processing operation, can be forwarded to other systems from intermediate register R4. This is indicated by an output line which leads to an amplifier. When external information is considered in the course of the program the data processing installation shown in FIG. 1 is operating as real-time-installation.

The operation register and the intermediate registers are connected to each other over distribution lines B1 and B2. The distribution of information among these registers can thereby be controlled with the aid of switching centers which are inserted into these connections. The switching centers in turn are connected to the outputs y and x of the operation decoder OD and the address decoder AD to effect control of the decoders. The connection of the switching centers to the decoders is made over the lines connecting the *x* and *y* output terminals of the shifting network to the *x* and *y* input terminals of the decoders.

Depending on the intended connections in each case the switching centers are designated by *y* or by *xy*.

Shift circuit network SN includes inputs which are connected to the VG circuit. Additionally it has inputs which are designated by *x* and *y*, and thus is connected to operation decoder OD, and address decoder AD. Shift network SN further includes inputs connected to intermediate stores. The intermediate stores are switched before an input goes to shift networks SN. The intermediate stores are supplied with information by address decoder AD and operation decoder OD, as is shown by reference sign *xy*. Other inputs of shift circuit network SN are connected to the input lines *w*. Line 13 leads from the output of the shift circuit network SN to command storage BS of program control mechanism PW. Jump commands are supplied by shift circuit network SN to command storage BS over this line.

An explanation of how jump commands which are to be executed are supplied by means of the shift circuit network SN when internal and external shift information is present is now given. Such a connection can be utilized for example, when during the course of the program processing operation it has already been indicated by the program control mechanism through an internal jump information that a jump is to be executed after the obtaining of an external jump information. Accordingly, only the external jump information determines which branch of the branching is to be utilized by reason of the jump command in order to further execute the program. For this operation the internal shift information can first be conveyed to one of intermediate storages *r*. This is done with the aid of a command word, over address decoder AD and operation decoder OD. This information remains temporarily stored in the intermediate register. It therefore stands before shift network SN and can serve as an input thereto. If during the further processing of the program, an external information which is transmitted to address decoder AD with the aid of an intermediate register and of operation register OR1 arrives, it can interact as jump information with the already stored internal information for the supplying of a jump command. This occurs when the external signal is effected over a line of shift circuit network SN which connects such points designated by *x*, so that the external signal causes the supplying of the shift command which was prepared by the previously stored internal jump information. An external jump signal can be present in place of, or in addition to, the stored internal jump information described above. The external jump information is supplied over one of the input lines *w*. This external signal can also contribute in the prescribed manner to the supplying of a shift command, whereby an additional information signal acts over decoder AD. The information acting over address decoder AD can also be an internal information, and can come solely from program control mechanism PW. How jump information signals interact within the shift circuit network SN is explained hereinafter.

The operation of the system as described above processes the input information such that a jump command is supplied from shift circuit network SN over line 13. The shift command signal causes a shift to the appropriate branch of the branching network. In the event that this shift command does not appear, the other branch of the branching network is used. With the aid of a further command word the internal jump information can again be cancelled in the intermediate storage means R which contained the information.

The lines over which external information is conveyed to intermediate register 12, or R3 serve as input lines to the registers. The information is then temporarily stored in the intermediate registers. The program control mechanism PW alone, or in conjunction with the information processing mechanism IW, can test the intermediate registers *r* in the course of the program processing operation. The intermediate registers will, upon reception of a testing signal emit and yield as an output the temporarily stored information. The stored information can also be utilized for carrying out of a comparison with another information present in the information processing mechanism IW to establish a shift information. This comparison can take place in a system which pertains to systems VG serving for information processing. The supplied shift information is then transmitted over a line leading from the system VG to shift circuit network SN, and helps to determine the supplying of a jump command. In this case also internal and external shift information can be utilized in supplying the shift command. Internal unconditional jump information and internal conditional jump information established during the course of the program processing through information processing mechanism IW can contribute to the generation of a jump command. A jump command as described above, is, for example, of importance in connection with the issuance of information to an external system which is served by the program controlled data processing installation. The information to be supplied to the external system can, for example, represent a control command which is to be executed within the external system. The control command is supplied by providing an internal unconditional jump information to one of the intermediate stores *r* in the manner already described. An acknowledgement information is then received from the external system which indicates that the control command has been executed. The acknowledgement signal appears as external shift information. If the acknowledgement signal appears as expected, then by reason of this jump command the branch of the branching network can again be used. Repetition of the control command is thus prevented. However, if the external jump acknowledgement information does not arrive, the jump command signal is absent and another branch of the branching network is used. A repetition of the control command is thus created. In the event of a further non-appearance of the external shift acknowledgement information a branch of the program can be used for a special program to test systems, which have participated in the supplying of the control command, in order to find an error which may have occurred. The program contains test command signals for this purpose.

The above-described procedure of supplying jump commands to be executed, can be used in real-time-installations which service different external systems. Thus, the process can be used to accomplish switching processes in a telephone exchange. In the establishment of connections between the subscriber stations in a telephone exchange, control commands are supplied to connect cross-point contacts through the switching matrix. After the connection is made acknowledgement signals which announce the completion of the connection must be provided.

The need for supplying a jump command signal which is to be executed during the switching processes in a telephone exchange also occurs when several points of the telephone exchange are tested for the presence of a certain operational condition. The operational conditions of these points are reported over input lines which, for example, lead over intermediate registers so that the operational conditions are temporarily stored in the form of external information. The basic address, which is present in operation register OR1, and which is conveyed first to the part AT of the command register provided for the reception of an address portion, and which is then conveyed from the reception portion AT to address decoder AD, combines with an operation part which is located in the command register, and which is utilized over operation decoder OD to test, the first intermediate register, for example intermediate register R2, so that external information stored in the intermediate register is conveyed to one of systems VG in order to test its individuality. Depending upon the results of the test of the individuality of the external information a signal is supplied by the VG system to the shift circuit network which either is or is not capable of releasing a jump command. If the shift circuit is not capable of releasing a jump command the previously used basic address is changed by one unit. The change is made with the aid of an index register in a known manner. After the address changes a new address results with which the next intermediate register, for example intermediate register R3, can be tested. The testing is done in the manner described above. The next intermediate register then conveys the external information it temporarily stored to the previously used system from among the systems of VG. Here again, depending upon the results of the second test an information which releases the shift may, or may not be supplied. If a signal is not supplied the previously changed basic address is again changed in the described manner. The interrogation of a further intermediate register then occurs. All these processes are repeated until either a station, having the operational condition in question, is found, or until all intermediate registers have been tested without finding a place in question. If a station is found, that is a connection is made, a jump command is supplied. When a jump command is supplied, the further interrogation of intermediate registers is terminated and a branch of the program which contains different command words is then used to serve the located station. If a station location is not found a shift command is not supplied and no jump is executed. The address which appears in operation register OR1 at this time simultaneously indicates which place must be serviced. If instead of different places to be serviced with the aid of such addresses different leap conditions in question are considered, the address then indicates which shift condition has contributed to supply the shift command.

The stations, which have been tested for their operating conditions in the above described manner, can, for example, be a group of subscriber stations, one of which is requesting a connection at the time of the test. However, the stations can also be a group of path segments which are contained within a switching stage of the switching matrix and which, therefore serve to establish a connection path between two subscriber stations, so that one of the stations must be found to be available for completing a connection. Obviously, however, places of an entirely different external system and which are appropriately connected to the testing can also be tested in this manner.

It is evident from the above-described operation of the inventive program controlled data processing installation that external information which arrives as inputs to the installation and which is relative to the operational condition of the switching matrix as well as exchange serviced by the inventive installation are utilizable as jump information. With the aid of the jump information and the other jump information explained in connection with the described operation, different shift conditions can effect the shift circuit network SN. The shift information is conveyed as a binary signal to shift circuit network SN. When the shift information signals are supplied by system VG, they are assigned shift conditions, which can be, for example a comparison of the two informations or a testing of an information according to a certain criterion. Shift circuit network SN can also be used to determined whether a jump is executed in the one or the other binary value of the binary signal assigned to a jump condition. In the following description the binary signal polarity is also considered to be a jump condition. The binary signal and its polarity condition can be conveyed, with the aid of a command word over operation decoder OD and over a line leading from decoder OD to the shift circuit network SN. The connection of shift information is also used to determine which of the shift conditions available is responsible for the execution, or non-execution of the shift. An address is provided for this purpose. The address is present in part AT of the command register OT-AT. Part AT of the command register OT-AT is provided for the reception of address portions. The address is effective over address decoder AD and over a line leading to shift circuit network SN. An example of the procedure followed is presented in more detail hereinafter. However, the information signals which have an effect over address decoder AD are considered as jump conditions in the form of addresses. In the above explained operational examples it has also been shown that through the connection of shift information it can be determined at which point in the course of the program an imminent shift is to be executed, or is not to be executed. All of these effects occur because the connection of shift information can also be achieved if the inventive program controlled, as real-time-installation, the operation of a different installation and if shift information arriving over the input lines concerns the condition of the different installation. Information processed in the data processing installation is taken from distribution line B2 and through an amplifier A is supplied to external systems (not shown). Line 1*r* supplies external information signals to the data processing installation here in question.

Figure 2:
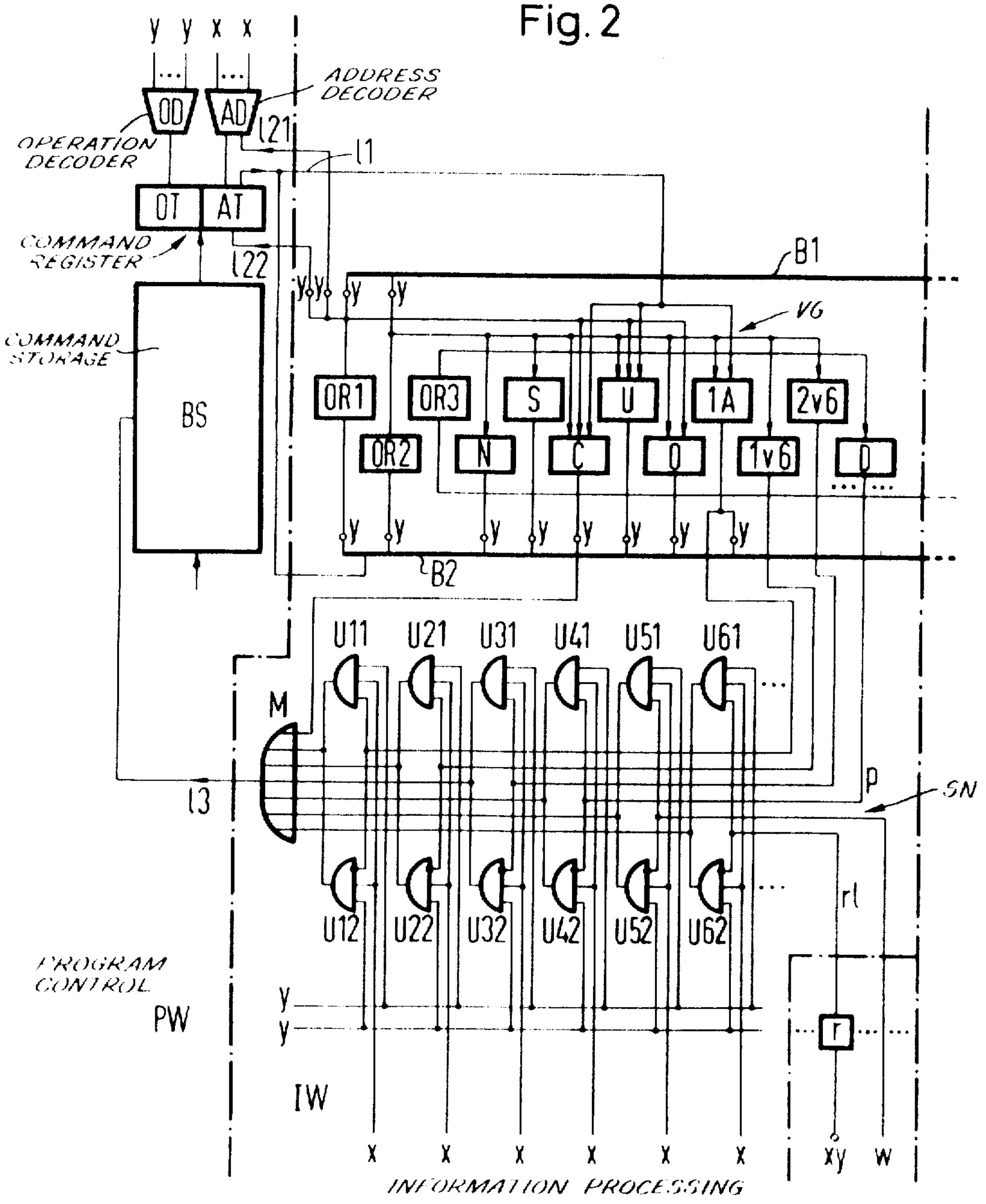
FIG. 2 shows details of the shift circuit network, and an information processing mechanism

FIG. 2 shows the shift circuit network SN in detail. Shift circuit network SN contains connection elements which are individually assigned to jump commands to be executed. After the appearance of command words for branching operations during the processing of the program the connection elements are tested, as required by the need for supplying connection results which represent jump commands, to determine which of the connection elements will execute the shifts. Each connection element includes a pair of three-input AND gates. Accordingly, AND gates U11 and U12, represent a connection element, etc. Each pair of AND gates can be interrogated over an individual line, designated X, with the aid of an address standing in the command register, under participation of address decoder AD. In a given case a binary signal is supplied by the combined outputs of the two AND gates contained within a connection element. The combined outputs determine, as jump command, the execution of a jump, if the combined output has one binary value. Similarly the combined output determines the non-execution of the jump if it has the other binary value. The outputs of all AND gates are connected over the OR gate M to the line 13 leading to the command store BS. One input of OR gate M is also connected to the output of circuit C of system VG. A jump command can be supplied by any of connection elements or any of the registers within circuit VG.

The pairs of AND gates which form the connection elements each have three inputs, as already mentioned. The first two inputs of the AND gates of each pair are jointly connected to a line *x* which is assigned to the address of the pair, as mentioned hereinabove. The two second inputs of the AND gates of each pair are jointly connected to a line transmitting internal or to a line transmitting external shift information through a NOT gate which appears before one of the two inputs. The NOT gates are connected before AND gates U11 . . . U62, and are indicated by a noticeable dot at the appropriate input. Internal shift information signals are transmitted over lines which lead from intermediate stores *r* to the AND gates. Internal jump information signals can also be transmitted over the lines which lead from the adding means 1A and also over the lines from the testing elements 1*v*6 and 2*v*6 to the AND gates. A device which will perform the function of adder 1A is described as element 23 in U.S. Pat. No. 3,497,630. The structural details of test member 1v6 can be found in FIG. 6 of U.S. Pat. No. 2,997,646, and the details of testing element 2v6 are described in U.S. Pat. No. 2,978,641. The shift information signals transmitted over the lines from the testing and adding circuits can also result from the combination of internal information and as external information acting together within information processing mechanism IW. Generally, external shift information signals are transmitted by lines P leading from information decoder D to the AND-gates. The decoder D is of known construction as described in FIG. 1*b* of U.S. Pat. No. 3,497,630. External information signals are also transmitted over the lines designated by reference sign *w*, which lead to the program controlled data processing installation from another installation.

The third inputs of the AND gates, which are connected with NOT gates, are also connected to a control line designated *y*. A jump is executed over the *y* lines only if binary signals, assigned to shift conditions, possess the proper binary value.

The third inputs of the AND-gates which are not connected to the NOT gates are connected over another control line designated *y*. A shift is executed over these lines only if the binary signals assigned to leap conditions possess the other binary value. In order to cause execution of the shift, a binary signal with the one binary value is also conveyed over the line designated *y*. The signal is supplied over operation decoder OD with the aid of the operation part of the command word present in the command register.

The addresses of pairs of lines *x*, assigned to AND-gates lead to address decoder AD, the inputs of which are connected with that part of the command register OT-AT, which pertains to program control mechanism PW. Accordingly, the address portion of a command word is present from case to case. The address of a pair of AND-gates, considered in the connection of shift information, is represented by the address portion of a command word. If the address portion is supplied by command store BS, it represents an internal shift information which determines which other shift information is also to be considered in the connection which is assigned to one of the provided shift conditions; i.e., these shift informations which are also to be considered are transmitted over lines in each case individually leading to a pair of AND gates, as has already been explained. The shift information to be also considered in the connection can be an external, or another internal shift information. For example, an external shift information is transmitted over line w to the pair of AND gates U51–U52, a further internal shift information is transmitted, for example, from intermediate store r to the pair of AND gates U61–U62.

The address of a pair of AND gates to be considered in a connection of shift information can also be represented by an information which was worked up within the course of the program under participation of the information processing mechanism. In this connection, the information is to be forwarded to address decoder AD, for example from operation register OR1. In order to make this possible the address decoder AD is additionally connected over a switching center y with operation register OR1 of the information processing mechanism over line 121. The transmission of such an address is caused by the operation portion of a command word, which causes the through-connection of the said switching center *y* over operation decoder OD. The address worked up within the program processing, under participation of the information processing mechanism IW, can also result by reason of external information signals which were previously interrogated by one of intermediate registers R2 or R3. Such an operational case was already described in connection with the explanation of the data processing installation shown in FIG. 1. The address at first supplied by operation register OR1 can also, in this connection, be conveyed over line 122 to the part of command register OT-AT, provided for the reception of an address portion of a command work, in order to make possible an additional effect, i.e., the utilization of an index register. The leap information also considered in the connection can be a further external or an internal shift information. Thus the shift circuit network can be utilized not only for the connection of external and internal jump information signals, but also for the connection of external and for the connection of internal jump information signals. In every instance it can also be determined at the same time at which point in time during the processing of the program an imminent jump is executed. In this connection, for example, the point in time at which the information serving as an address is forwarded from the operation register to the address decoder, is utilized. The information shifting function determines, directly or indirectly, the point in time at which the shift is executed. The execution of the shift is accordingly prepared, for example, because a shift information signal is conveyed beforehand to one of the intermediate stores.

FIG. 2 shows in detail the different systems for information processing. Several of those have been previously mentioned, i.e., the adding means 1A, the testing element 1*v*6 and the information decoder D. The adding means serves to change an information standing in an operation register in the sense of adding a one. Testing element 1v6 serves to test an information consisting of six binary signals for completeness. The information is checked to determine that at least one binary signal has the desired binary value. Testing element 2*v*6 is used for the testing of the ambiguity of the information. Element 2*v*6 therefore makes it known if more than one of the binary signals of the information has the desired particular binary value. Information decoder D is used for the conversion of one of the said informations into a form with code 1 of *m*.

In addition to the above circuits, the information process circuit also includes the NOT gate N, the shifting element S, the comparison element C, the AND gate U and the OR gate O. The structural details of the shifting element S are described in U.S. Pat. No. 2,975,365, and the remaining elements which form the information processing circuit are basic logic circuit building blocks of known construction, so that the latter need not be described further. The inputs of all of these systems to the information processing circuit are connected differently, consistent with their particular utilization, to the outputs of operation register OR1 and OR2. Information decoder D, however, is connected to the operation register OR3 which receives external shift informations. Systems C, U and 1A are in addition connected directly over line 11 to part AT of command register OT-AT. This is done so that a basic address which was supplied originally by operation register OR1, and which was changed in an index register, can be subjected to a comparison with an available information, for example, an information standing in operation register OR2. This process has already been used in one of the operation examples mentioned in detail above. Because the 1-adding means is also connected to line 11, the 1-adding means can be used in the manner of an index register to change an address.

The internal shift functions include unconditional shift information, which, for example are supplied by means of a call up of a command word in the command store over part AT of the command register. Internal conditional shift information signals can be developed in different ways by the information processing mechanism IW. For example, information signals which appear in the course of the program processing operation in two operation registers of the information processing mechanism IW are compared, by means of comparison element C, as a shift condition. Therefore one of the two informations to be compared can be a temporarily stored earlier result of an information processing operation. One of the two informations to be compared could, however, have been supplied previously by an additional installation controlled by the instant installation and which was tempararily stored until comparison. The finally worked up shift information is based in this case on internal as well as on external informations. Conditional shift informations can also be developed because as a shift condition, informations of *n*-binary signals which occur in the course of the processing of the program in an operation register of the information processing mechanism, are tested for maintenance of the code *x*— of *n*, whereby *x*=*n* is predetermined. Examples of this were presented above with the aid of the testing elements 1v6 and 2v6.

What is claimed is:

1. In a program controlled data processing installation for controlling telecommunication exchange systems having a program control means which operates an information processing means for executing programs including branching operations which are indicated by jump commands, the improvement comprising:

jump switching circuit means including a plurality of coupling circuits for forming and communicating instruction signals to said program control means, said instruction signals indicating one of the execution and non-execution of a jump command, said instruction signals being formed from internal and external jump information coupled to said jump switching circuit means, first input means from said information processing means to said jump switching circuit means over which jump information processed internally and dependent on said processing in the course of the execution of a program is routed, second input means from said program control means to said jump switching circuit means over which internal unconditional jump information is routed, and third input means from external lines to said jump switching circuit means, said external lines being connected to said systems controlled by said data processing installation, said external lines and said third input means routing external jump information to said data processing installation.

2. The program controlled data processing installation defined in claim 1, wherein said coupling circuits in said jump switching circuit means are gating elements individually assigned to shift commands to be executed, and further comprising:

testing means for testing said gating elements after the appearance of command words for branching instructions during the processing of the program in order to supply connection results representing jump commands which determine the execution of jumps.

3. The program controlled data processing installation defined in claim 2, wherein each of said gating elements is constituted by a pair of AND gates, each said AND gate having three inputs, a further comprising:

address line means, one of which is assigned to each gate pair, transmission line means for transmitting internal and external jump information and, NOT gate means adapted to be switched before the inputs of said AND gates, the two first inputs of each said AND gate pair being jointly connected to one of said addresss lines, two second inputs of each said AND gate pair being connected jointly to a transmission line and switching means for switching one of said NOT gate means before said second inputs, third input means of said AND gates being connected to said NOT gates and to a control line.

4. The program controlled data processing installation defined in claim 3, further comprising:

address decoder means and command register means in said program control means, and wherein said address lines assigned to addresses of pairs of said AND gates are connected to said address decoder, the inputs of said address decoder being connected to a portion of said command register.

5. The program controlled data processing installation defined in claim 4, wherein the address of a pair of said AND gates is represented by the address portion of a command word.

6. The program controlled data processing installation defined in claim 4, further comprising:

operation register means in said information processing means and means in said information processing means for generating an information signal corresponding to the addresses of said pairs of AND gates, and wherein said address decoder means is additionally connected to said operations register and the address of a pair of AND gate means considered in making a connection of jump information is represented by the information established within the course of the processing of the program and is forwarded to said address decoder over said operation register.

7. The program controlled data processing installation defined in claim 4, further comprising:

operation decoder means adapted to receive the operation portion of a command word from said program control mechanism and control lines means connecting said operation decoder means to said third inputs of said AND gates.

* * * * *